(No Model.)
2 Sheets—Sheet 1.
W. STRAIT.
HORSE HAY RAKE.
No. 473,795.
Patented Apr. 26, 1892.
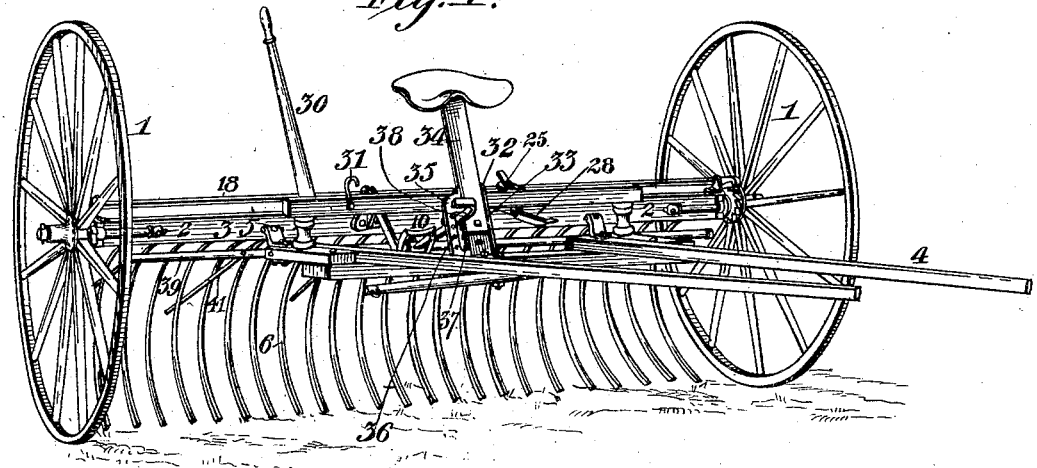
Fig. 1.
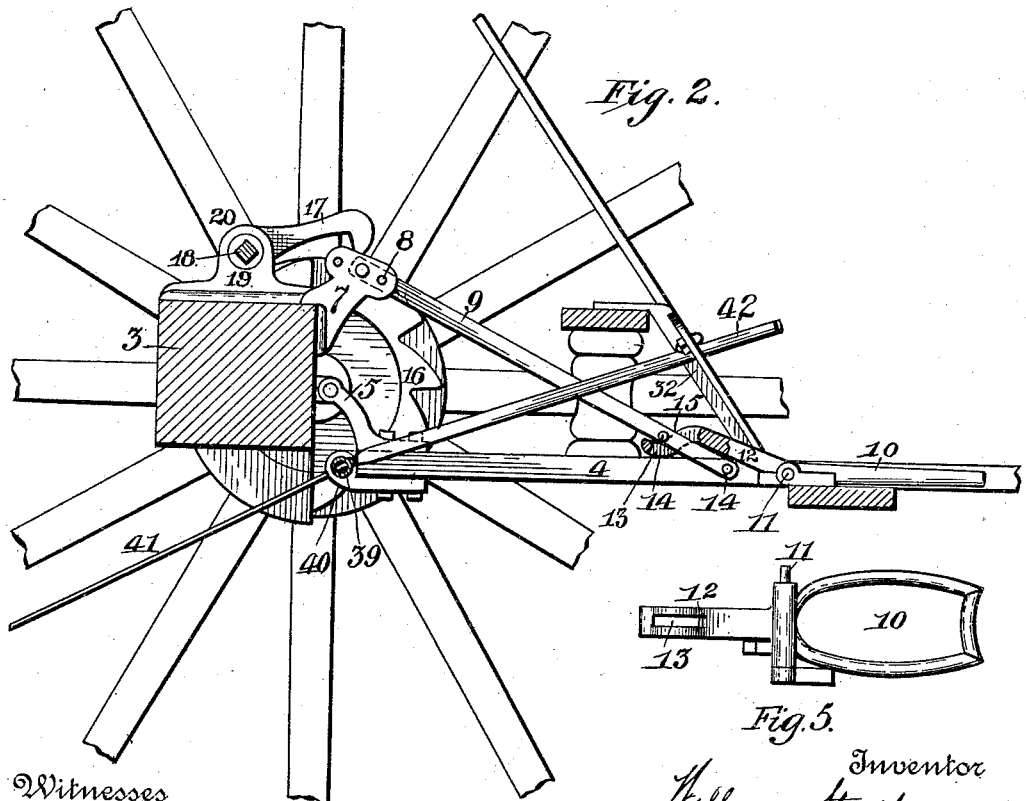
Fig. 2.
Fig. 5.
Witnesses
Inventor
William Strait
by G. B. Brock
Attorney (No Model.)  W. STRAIT.  2 Sheets—Sheet 2.
HORSE HAY RAKE.
No. 473,795.  Patented Apr. 26, 1892.
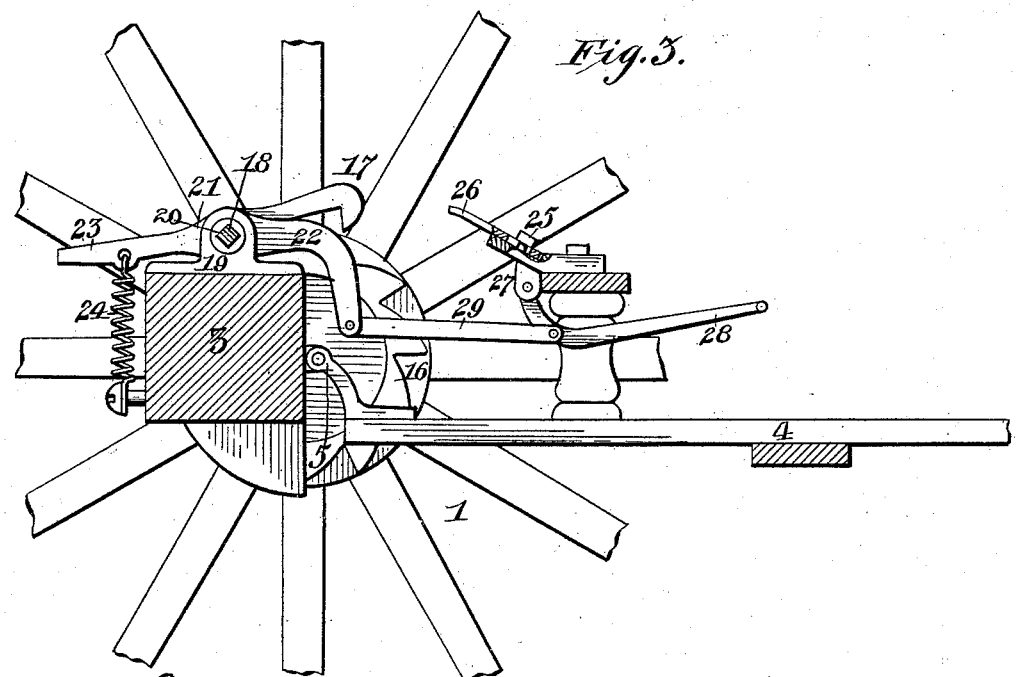
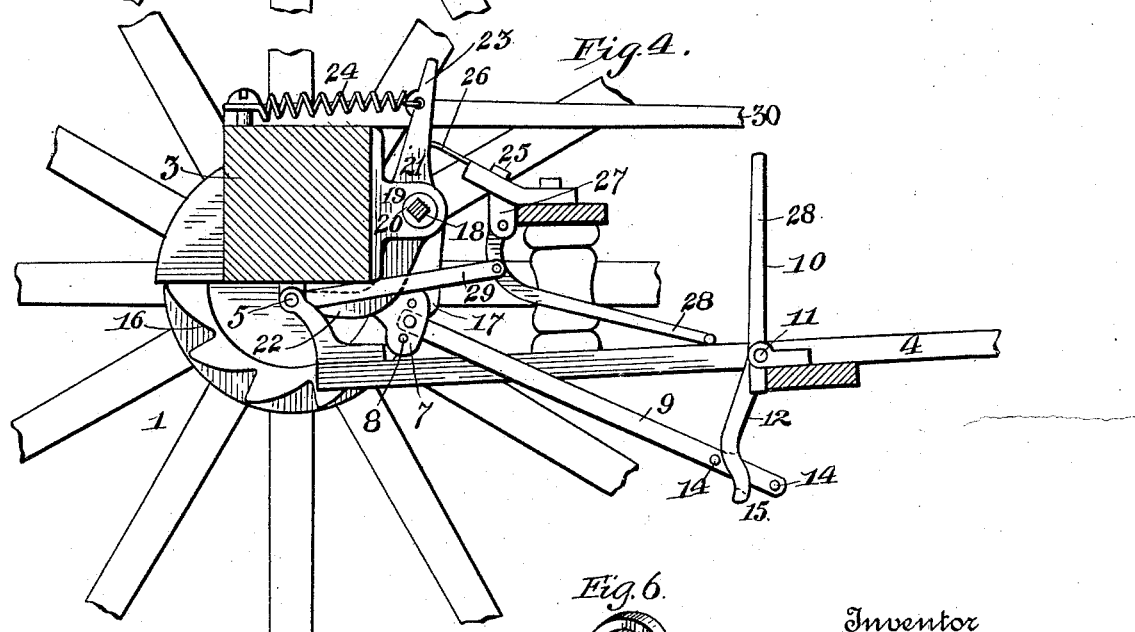
Witnesses  Inventor
Severance  William Strait
Wm L Boyden  by F. B. Brock
  Attorney

UNITED STATES PATENT OFFICE.

WILLIAM STRAIT, OF ELMIRA, NEW YORK.

HORSE HAY-RAKE.

SPECIFICATION forming part of Letters Patent No. 473,795, dated April 26, 1892.

Application filed November 25, 1891. Serial No. 413,099. (No model.)

*To all whom it may concern:*

Be it known that I, WILLIAM STRAIT, a citizen of the United States, residing at Elmira, in the county of Chemung and State of New York, have invented certain new and useful Improvements in Horse Hay-Rakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

Figure 1 is a perspective view of a rake embodying my invention. Fig. 2 is a detail sectional view chiefly showing the means for holding the rake down. Fig. 3 is a detail sectional view chiefly showing the draft dumping mechanism. Fig. 4 is a detail sectional view illustrating the main operative parts of the rake when the rake is dumped. Fig. 5 is a detail plan of the foot-treadle. Fig. 6 is a detail view of the thimble on the dog-operating rod.

My invention relates to horse-rakes.

The mechanical features of my improvements in so far as they may be used in other machines it will be clearly understood are not confined to their employment in a horse-rake.

My invention consists in the following construction and combination of parts, which will first be fully set forth, and the novel features then pointed out in the claims.

In the drawings, 1 are the wheels.

2 are the axles.

3 is the rake-head, forming virtually a continuation of the axles.

4 are the thills and thill-frame.

5 are the thill-couplings, the joints of which are substantially in axial line with the axles 2.

The connection of the rake-head 3 to the thills 4 by the thill-couplings 5 is such that the thills are below the center of motion of the rake-head for a purpose hereinafter stated. Where the phrase "center of motion" is used, the oscillation or vibration of the rake-head on its axis is meant.

6 are the rake-teeth.

7 is an arm bolted to the rake-head 3 above and forward of the center of motion of said head. 8 is a series of bolt-holes therein, within which the link 9 may be adjustably pivoted.

10 is a foot-treadle pivotally hung at 11 to the thills 4.

12 is the rear extension of the treadle having a slot 13 therein, through which the link 9 passes. The upper and lower sides of the treadle-extension 12 are curved, as shown, to permit the link to operate therein in the different relative positions of the parts and to provide a bearing against which the limiting-stops 14 on the link 9 may strike in its vibration through the slot 13. It will be noticed that the pivot 11 of the treadle is below the center of motion of the rake-head, as is also the joint 15 between the link 9 and the treadle. It will also be noticed that in the dumping of the rake the arm 7, carrying the opposite end of the link 9, passes from the point forward of and above the rake-head's center of motion to a point below and forward of said center. These features above referred to are important ones in the successful operation of my rake, as will be made clearly apparent. The oscillation of arm 7 above and below the head's center of motion and forward thereof results in the minimum travel from front to rear of the link 9. The joint between the link and treadle being also below the center of motion of the head, as well as the pivotal point of the treadle, the relation of these parts is such that when the rake is dumped the treadle will not be thrown beyond substantially a vertical line, as shown in Fig. 4. As a result of this construction and relation of parts the operator has an effective leverage and complete control of the rake throughout its movements, is not obliged to take his foot from the treadle at all, and the treadle is not thrown so far backward when the rake is up that his power over it is gone. The pressure of the foot on the treadle locks the rake down; but when the draft dumping mechanism is thrown into engagement the joint 15, being below the head's center of motion, will be broken, notwithstanding the weight of the foot upon the treadle, and pass below the pivotal point of the treadle. The pressure of the foot upon the treadle when the rake is up cannot lock the rake up, but acts, on the contrary, to force the rake down throughout its vibration and also when the dumping mechanism is released. The reason why this action results is due to the relative position of the head, treadle, and connecting-link, whereby an effective leverage can be exerted upon the treadle to throw the rake down when the rake is up and to hold and lock it down when the rake is down, the pivotal point of the treadle being below the center of motion of the head and the link attachment of the treadle to the head passing from a point above to a point below said center. The rear end of the treadle engages the pin 14 at the joint 15 by pressure thereon and acts as a variable tension on the teeth in raking. The loose play of the link 9 between the pins 14 permits the teeth to turn under when backing. It also permits the teeth to drop back after dumping without the least jar to the rake, and provides, further, for the free oscillation of the thills. The link 9 may be pivoted directly to the head in the same relative position instead of to the arm 7.

16 are ratchet-teeth on the wheels.

17 are the pivoted dogs engaging the ratchets, said dogs being fixedly carried upon the angular rod 18, extending clear across the rake-head 3.

19 are the boxes on the head in which rod 18 works.

20 are annular thimbles or sleeves having angular apertures, which are slipped over rod 18 and housed in the boxes 19, where they are free to oscillate.

21 is the dog-operating lever, carried upon rod 18 and keyed thereto or rigid therewith. One end 22 of this lever extends forward and is provided with lever mechanism for throwing the dogs into engagement, and the other end 23 projects rearward where it is provided with a spring 24 for normally holding the dogs out of engagement, and said end 23 is further adapted to engage an adjustable stop 25 upon the thill-frame when the rake-head oscillates to throw the dogs 17 out of gear and release the rake. Stop 25 consists of an adjustable projecting arm 26, having a slot therein, through which a bolt or set-screw takes to secure it at any desired point. The stop-piece 25 has downwardly-projecting ears or bearings 27, within which the treadle 28 is pivoted.

29 is a link pivotally connected to the treadle 23 and to the end 22 of the lever 21. By pressing down on the treadle 28 the end 22 of lever 21 is thrown into substantially axial line with the bearings or center of motion of the rake-head. As a result of this construction the rear end of link 29 is also brought in axial line with the head, and during the ensuing movement of the head upon its bearings the link and its attached treadle 28 are stationary, thereby providing a minimum movement to the treadle, which otherwise would describe an arc of considerable extent and when released would fly back with great force, tending to break the parts.

30 is the hand-lever for dumping the rake independently of the draft device. Owing to the thills being brought down lower in relation to the rake-head and the joint 15 and treadle 10 being hung below the head's center of motion I am enabled to bring the lever 30 so far forward when the rake is up that I use it for a foot-treadle also, and the foot is placed upon the same to hold the rake up. This position of the lever as a treadle is seen in Fig. 4. To lock the rake up permanently, the hook 31 engages the lever 30.

32 is the seat-standard, which is rigidly secured to the upper and lower cross-bars of the thill-frame and serves as a brace therefor. It is provided on its front side with flanges 33, within which slides and is adjustably bolted the seat-spring 34.

35 is a lateral slotted extension of the seat-standard, on one side of which is a series of bolt-holes 36, and on the other a series of notches 37, within which holes and notches a bolt 38 is adjustably set for a purpose to be described. This bolt 38 is adapted to be removably inserted in any one of the holes 36 and is bent at right angles or L-shaped, one of the angular ends projecting across the slot in which the lever 42 works and rests within one of the opposite notches 37.

39 is a cleaner-rod hung in suitable bearings 40 on the thills, so as to oscillate therein.

41 are the cleaner-arms, projecting rearward therefrom, and 42 the cleaner-actuating arm, rigid with rod 39 and projecting forwardly through the slot in the seat-standard. This arm or lever 42 terminates in a treadle, the depression of which elevates the cleaner-arms and permits the rake to be backed over a bunch or windrow of hay. The bolt 38 permits the cleaner-arms to be adjustably set, subject to a limited oscillation, both of which are entirely independent of the action of the rake head and teeth.

I claim—

1. The combination of a frame, wheels, an axle, a vibrating head, connections between the head and wheels for oscillating the head, a treadle pivoted to the frame, and a link pivoted at one end to the treadle and at the other to the head above and forward of the center of motion of the head, the pivotal joint between the link and treadle lying below the line of the center of motion of the head throughout the movements of the rake and the joint between the link and the head passing below said center when the rake is up.

2. In a rake-locking mechanism, the combination of a frame, a head having suitable bearings, a treadle pivoted to the frame, having a slot therein, a link pivoted to the head and passing through said slot, and pins or stops on the link for limiting its play.

3. The combination of a frame, a head, a treadle pivoted to the frame, having a curved bearing-surface thereon, and a link pivoted to the head and loosely connected to said treadle and provided with a pin or stop adapted to bear against said curved or inclined surface.

4. The combination of a frame, a vibrating head having suitable bearings, a dog-operating lever or its equivalent pivoted upon the head, and a lever connection pivoted to the frame and to said dog-operating lever, whereby when the lever connection is operated the pivotal joint between said dog-operating lever and connection is thrown into substantially axial line with said bearings of the head.

5. The combination of a frame, a vibrating head having suitable bearings, a dog-operating lever pivoted upon the head, having projecting arms, a lever connection pivoted to the frame and to said dog-operating lever-arm, and a stop upon the frame, whereby when the lever connection is operated the pivotal joint between it and the dog-lever is thrown into substantially axial line with the rake-head bearings and one of the projections on said dog-lever is thrown into engagement with the stop upon the frame.

6. The combination, with the frame and rake-teeth, of a cleaner-bar pivoted to the frame, cleaner-fingers on said bar, a lever attached to the cleaner for oscillating the same and independent of the rake-teeth, and an adjustable stop upon the frame for variously adjusting the normal position of the cleaner.

In testimony whereof I affix my signature in presence of two witnesses.

WM. STRAIT.

Witnesses:
    FENELON B. BROCK,
    GEO. L. CLARK.